United States Patent [19]

Affa

[11] Patent Number: 4,459,750
[45] Date of Patent: Jul. 17, 1984

[54] REFERENCE MARK SELECTION ARRANGEMENT FOR MEASURING INSTRUMENT

[75] Inventor: Alfred Affa, Stein, Fed. Rep. of Germany

[73] Assignee: Dr. Johannes Heidenhain GmbH, Traunreut, Fed. Rep. of Germany

[21] Appl. No.: 459,378

[22] Filed: Jan. 20, 1983

[30] Foreign Application Priority Data

Feb. 5, 1982 [DE] Fed. Rep. of Germany ....... 3204012

[51] Int. Cl.³ .......................... G01B 11/02; H01J 3/14
[52] U.S. Cl. ............................. 33/125 C; 250/237 G
[58] Field of Search .......... 33/125 A, 125 C, DIG. 3; 250/237 G, 578; 356/375

[56] References Cited

U.S. PATENT DOCUMENTS

| | | | |
|---|---|---|---|
| 3,982,106 | 9/1976 | Stutz | 250/237 G |
| 4,101,764 | 7/1978 | Nelle | 250/237 G |
| 4,158,509 | 6/1979 | Rieder et al. | 250/237 G |
| 4,363,964 | 12/1982 | Schmitt | 250/237 G |
| 4,385,836 | 5/1983 | Schmitt | 33/125 C |
| 4,400,890 | 8/1983 | Ohkubo et al. | 33/125 C |
| 4,403,859 | 9/1983 | Ernst | 33/125 C |

*Primary Examiner*—Richard R. Stearns
*Attorney, Agent, or Firm*—Willian, Brinks, Olds, Hofer, Gilson & Lione, Ltd.

[57] ABSTRACT

An incremental measuring instrument having a series of reference marks extending alongside a division of a scale is provided with a selector element which is slideable along the length of the scale and can be aligned with a selected one of the reference marks in order to bring the selected reference mark into operation. The position of the selector element with respect to the selected reference mark is fixed by a plurality of filler elements which cooperate with a selector element to form a column of elements arranged end to end within a guide. Holding elements at the ends of the guides preclude undesired longitudinal movement of the column of elements.

18 Claims, 8 Drawing Figures

REFERENCE MARK SELECTION ARRANGEMENT FOR MEASURING INSTRUMENT

BACKGROUND OF THE INVENTION

This invention relates to an improvement for measuring instruments of the type comprising a measuring scale which extends along a measuring direction and defines a measuring division and a plurality of reference marks; a scanning unit which includes means for detecting the reference marks and means for detecting at least one selector element positioned adjacent to the scale; and means for generating a reference pulse only when one of the reference marks and the selector element are simultaneously detected, such that only those reference marks which are associated with one of the selector elements are brought into operation.

Such incremental measuring instruments include a measuring scale that can be made either of one piece or of a number of separate pieces joined end to end (German Pat. No. 16 98 006), and utilize reference pulses as described above in various ways. For example, a reference pulse can be used as a signal for setting a display or counter to zero. Alternatively, reference pulses can be used for calling up a certain position at the beginning of a measurement, for the control of interference pulses, as well as for controlling various control devices.

German DE-AS No. 25 40 412 discloses a measuring instrument which includes a scale that includes a series of reference marks on the scale which are fixedly positioned with respect to one another. The disclosed measuring device includes at least one selection element which is positioned either on the scale itself or in the immediate vicinity of the scale. By means of this selection element, one or more reference marks can be selected and brought into operation. For example, the measuring instrument may include a scanning unit which includes a switching means adapted to detect the presence of the selector element. In this arrangement, for each reference mark that is to go into operation, a respective selector element (such as a magnet) is allocated. When the scanning unit moves past this selector element during the measuring process, the switching means (which may include an electric switch, such as a reed switch for example) detects the magnet and generates an electronic output which together with the electronic output of the scanning unit in response to the reference mark is applied to an electronic component. This electronic component generates a reference pulse only if the scanning unit indicates that one of the selector elements has been detected simultaneously with one of the reference marks.

Each of the selector elements is shiftable in the direction of movement of the scanning unit, and must be fixable in a reproducible position with respect to the reference mark to be selected.

SUMMARY OF THE INVENTION

The present invention is directed to an improved measuring instrument of the type described above which includes a particularly simple, reliable, and accurate apparatus for fixing the position of one or more selector elements with respect to the selected reference marks.

According to this invention, a measuring instrument as described above is provided with means for defining a guide which extends along the measuring direction adjacent the scale. A column of elements is coupled to the guide, and this column of elements includes at least one selector element, as well as a plurality of filler elements positioned end to end. The guide, the selector element, and the filler elements are shaped such that the column of elements is slideable along the guide, yet is prevented from moving laterally out of contact with the guide. In addition, holding elements are positioned at two spaced locations of the guide and are movable between a first position, in which the column is slideable along the guide, and a second position, in which the end elements of the column of elements are prevented from moving longitudinally past the holding elements. The column of elements is of a length selected completely to fill the length of the guide between the holding elements in order to hold the at least one selector element in position, aligned with the selected ones of the reference marks.

This invention provides the important advantage that the selector element is fixed in position with respect to the reference mark in a manner which is not subject to wear, which is simple to manufacture, and which permits a straightforward and certain allocation of the selector element with respect to the selected ones of the reference marks. The present invention precludes unintended shifting of the selector element, yet it allows longitudinal shifting of the selector element for the purpose of aligning it with a selected one of the reference marks in a simple manner which is not impeded by dirt or impurities in the guide. Furthermore, selector elements which are not visible from outside the measuring instrument, for example selector elements positioned inside the housing of an incapsulated measuring instrument, can be simply and clearly allocated to any desired one of the reference marks merely by counting the filler elements which are removed from one end of the guide and reintroduced at the other end of the guide. Further advantageous features of this invention are set forth in the attached dependent claims.

The invention itself, together with further objects and attendant advantages, will best be understood by reference to the following detailed description taken in conjunction with the accompanying drawings.

BRIEF DESCRIPTION OF THE DRAWINGS

FIG. 3b is a side elevational view of the measuring instrument of FIG. 3a.

DETAILED DESCRIPTION OF THE PRESENTLY PREFERRED EMBODIMENTS

Figure 1:
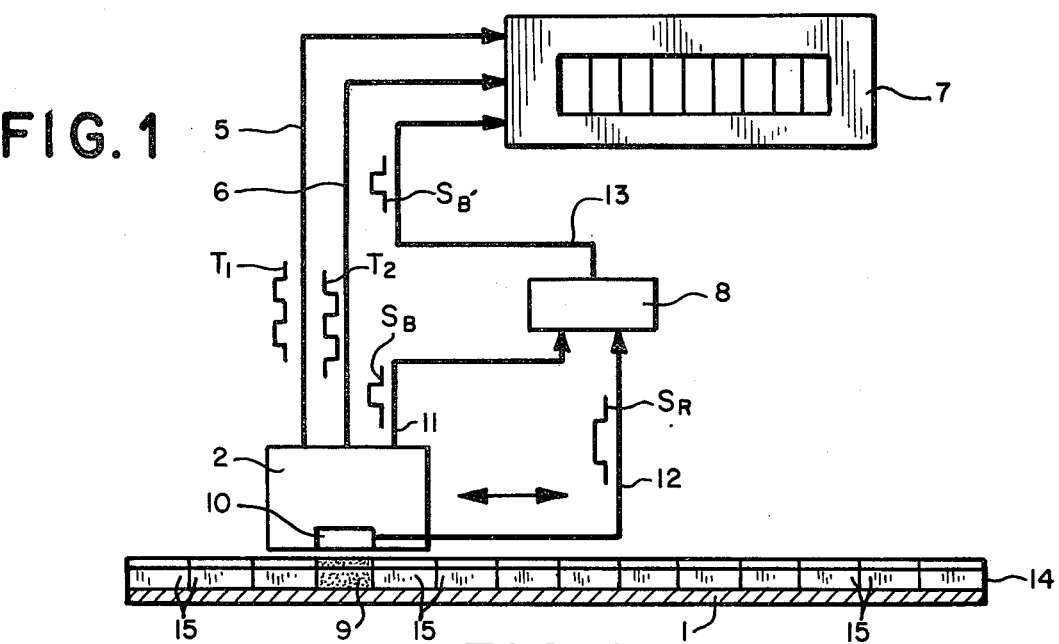
FIG. 1 is a schematic representation of an incremental measuring instrument which includes a first preferred embodiment of the present invention.
Figure 2:
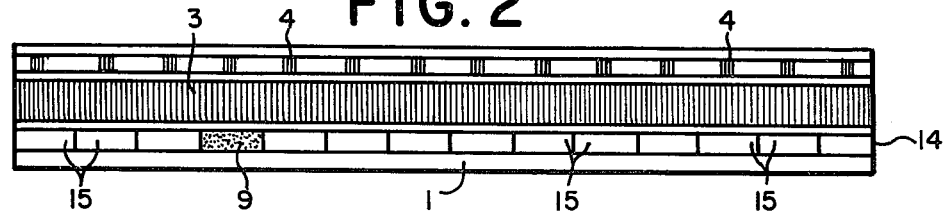
FIG. 2 is a plan view of the scale of FIG. 1.

Turning now to the drawings, FIGS. 1 and 2 show a photoelectric, incremental, length measuring instrument which includes a measuring scale 1 and a scanning unit 2. The scale 1 and the scanning unit 2 are connected respectively to first and second objects, the relative positions of which are to be measured. The scale 1 defines a division 3 in the form of a line grid (as shown in FIG. 2), and the scanning unit 2 includes means (not shown) for photoelectrically scanning the line grid without physical contact in the direct light mode of operation. Alongside the division 3 there is provided on the scale 1 a series of equidistant reference marks 4. Each of the reference marks 4 includes a line group having a predetermined line distribution. The scanning unit 2 generates periodic scanning signals as it scans the line grid 3, which scanning signals are amplified in the scanning unit 2 and converted into square wave signals $T_1, T_2$ which are passed via conductors 5,6 to an electronic counter 7. The electronic counter 7 responds to the square wave signals $T_1, T_2$ by determining a measured position value which is displayed in digital form. The square wave signals $T_1, T_2$ are phase shifted with respect to one another by one quarter of the grid constant of the division 3 in order to allow the scanning direction to be determined. The scanning unit 2 also includes means for detecting the reference marks 4 and for generating a reference pulse $S_B$ in response thereto. The reference pulse $S_B$ is a square wave signal which is applied via conductor 11 to an electronic component 8.

The particular reference mark 4 that is to go into operation in the measuring process is selected by allocating a selector element in the form of a magnet 9 in this embodiment to the selected reference mark. As the scanning unit 2 approaches the selected reference mark and the allocated selector element, the magnetic field of the magnet 9 drives a switching means (such as a reed switch 10) included in the scanning unit 2. The output signal $S_R$ of the switching means is applied via a conductor 12 to the electronic component 8. Only if both of the signals $S_B, S_R$ on conductors 11,12 are simultaneously applied to the inputs of the electronic component 8 is a signal $S_B'$ generated on output conductor 13 and applied to the electronic counter 7. In this embodiment, the electronic counter 7 responds to the signal $S_B'$ on conductor 13 as, for example, by setting the counter 7 to the numerical value zero.

In this embodiment, the magnet 9 is slideable in a T-shaped groove 14 which is defined by the scale 1 and extends along the measuring direction. In this way, this magnet 9 can be moved into position in alignment with any selected one of the reference marks 4. The magnet 9 is fixed in position with respect to the selected reference mark 4 by filler elements 15. In this embodiment, each of the filler elements 15 has a length equal to the separation between adjacent ones of the reference marks 4 on the scale 1. The length of the magnet 9 is selected such that the entire length of the groove 14 is filled by a column of elements made up of the magnet 9 and the filler elements 15. The maximum length of the magnet 9 in this embodiment corresponds to the spacing between adjacent reference marks 4. The magnet 9 can be aligned with another of the reference marks 4 by removing a corresponding number of the filler elements 15 on one end of the groove 14 and replacing these previously removed filler elements 15 at the other end of the groove 14. The filler elements 15 are secured (in a manner not shown in FIG. 2) at the ends of the groove 14 against moving longitudinally out of the groove 14.

Figure 3A:
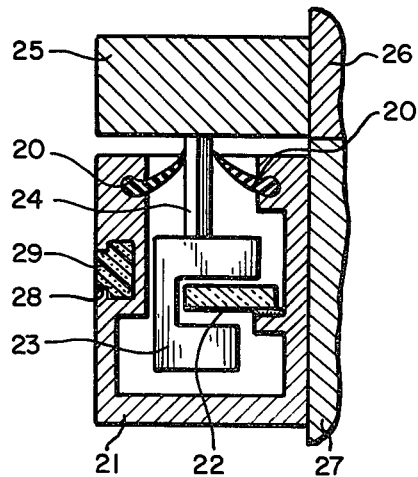
FIG. 3a is a cross-sectional view of an incremental measuring instrument which includes a second preferred embodiment of this invention.
Figure 3B:
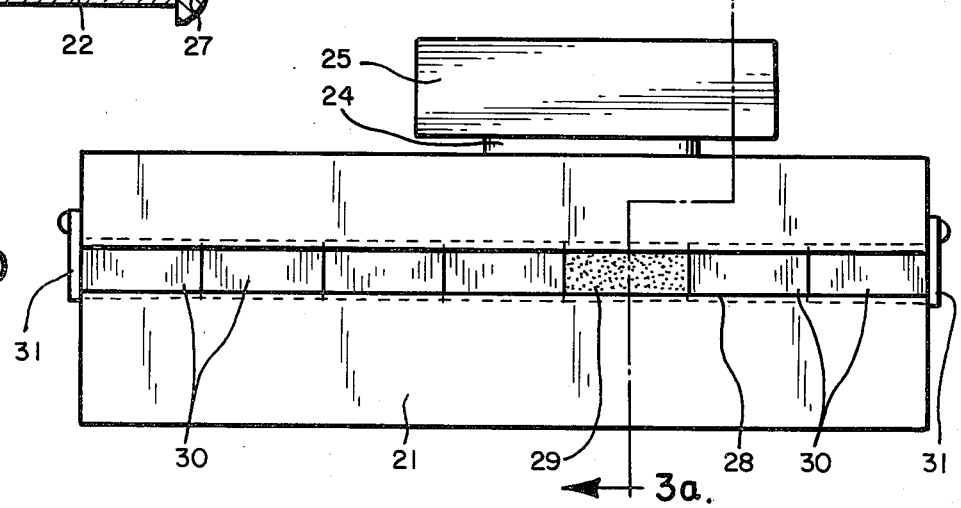

Turning now to FIGS. 3a and 3b, these figures show a second preferred embodiment of this invention. The measuring instrument of FIGS. 3a, 3b is an incapsulated length measuring instrument of known construction type which includes a housing 21 which is enclosed by sealing lips 20. A scale 22 is mounted inside the housing 21 and is scanned by a scanning unit 23. The scanning unit 23 is fastened to a follower 24, which is in turn fastened to a mounting element 25 which is mounted to the slide 26 of a machine (not shown). In this embodiment, the housing 21 is formed of aluminum and is mounted directly to the bed 27 of the machine.

As best shown in FIG. 3a, a T-shaped groove 28 is formed in the side of the housing 21 facing away from the machine. A selector element in the form of a magnet 29 is allocated to a selected one of the reference marks (not shown) of the scale 22. The rest of the length of the groove 28 is entirely filled by a plurality of filler elements 30. The magnet 29 can be moved into alignment with another one of the reference marks in the same manner as that described above in conjunction with FIGS. 1 and 2. As shown in FIG. 3b, this embodiment includes swingable plates 31 mounted at the ends of the groove 28. These plates 31 act as holding elements to block the ends of the T-shaped groove 28 in order to prevent the magnet 29 and the filler elements 30 from moving longitudinally in the groove 28. Each of the swingable plates 31 can be moved out of alignment with the groove 28 in order to allow the filler elements 30 to be removed from or inserted into the groove 28.

In both embodiments discussed above, the magnets 9, 29 and the filler elements 15, 30 are positioned end to end to form respective columns of elements positioned within the grooves 14, 28. In each case, the column of elements completely fills the length of the groove 14, 28, and thereby precludes any unintentional shifting of the magnets 9, 29 with respect to the scale 1, 22. Since the grooves 14, 28 are completely filled, it is not possible for dirt or other impurities to accumulate in the grooves 14, 28. In this way, dirt and impurities which might make it difficult to shift the magnets 9, 29 are prevented from accumulating.

Figure 4:
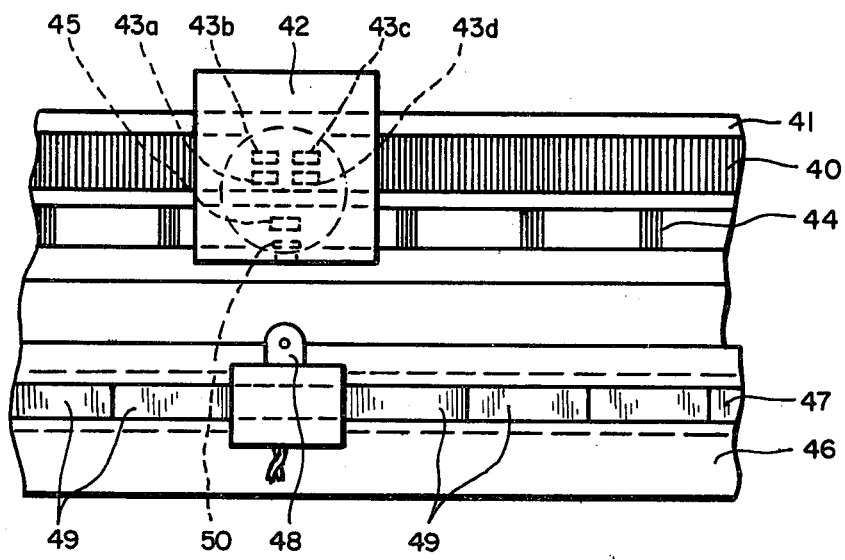
FIG. 4 is a partial plan view of a scale and scanning unit of a measuring instrument which includes a third preferred embodiment of this invention.

FIG. 4 shows a third preferred embodiment of this invention which includes a scale 41 which defines a division 40. This division 40 is scanned by a scanning unit 42 by means of scanning elements 43a through 43d. The scale 41 also defines a series of reference marks 44 which are scanned by an additional scanning element 45 included in the scanning unit 42. The scale 41 is fastened to a carrier 46 which defines a guide or groove 47 which is T-shaped in cross-section. This T-shaped guide or groove 47 runs parallel to the division 40. A selector element in the form of a lamp 48 can be aligned with any selected one of the reference marks 44 by sliding the selector element along the measuring direction. In order to fix the position of the lamp 48 with respect to the selected reference mark 44, there is provided a series of filler elements 49 which cooperate with the selector element to completely fill the groove 47. This embodiment is also provided with holding elements (not shown) at the ends of groove 47 to prevent the filler elements 49 from moving longitudinally out of the groove 47. When, during the measuring process, a selected reference mark 44 is scanned by the scanning unit 42, the light of the lamp 48 falls upon a photosensor 50 in the scanning unit 42 in order to cause the associated reference mark 44 to go into operation. The lamp 48 can be moved into alignment with another one of the reference marks 44 in the manner described above in conjunction with the first preferred embodiment.

Figure 5:
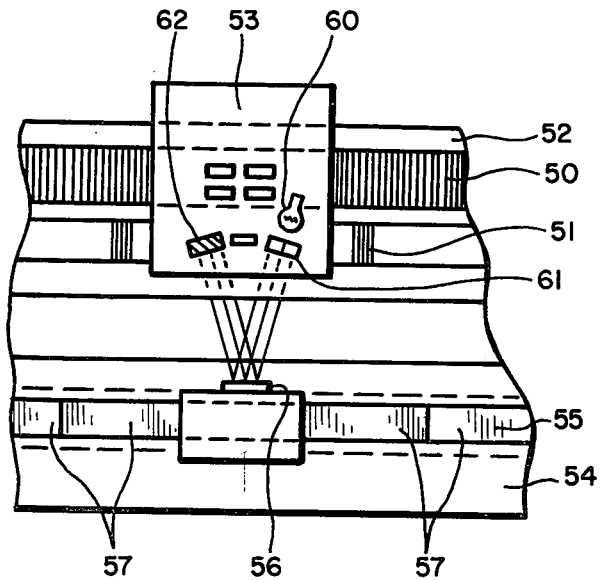
FIG. 5 is a partial plan view of a scale and scanning unit of a measuring instrument which includes a fourth preferred embodiment of this invention.

FIG. 5 shows a portion of a fourth preferred embodiment of this invention which is incorporated in a measuring instrument which includes a scale 52 which defines a grid division 50 and a series of reference marks 51. The division 50 and the reference marks 51 are scanned by a scanning unit 53. The scale 52 is mounted on a carrier 54 which defines a guide groove 55 having a T-shaped cross section. A selector element in the form of a mirror 56 is slideable along the measuring direction such that the mirror 56 can be aligned with any selected one of the reference marks 51. In order to fix the position of the mirror 56 with respect to the selected reference mark 51, there are provided a number of filler elements 57 which completely fill the remainder of the groove 55 and and are secured against longitudinal movement in the groove 55 in a manner not shown in FIG. 5. When, during the measurement process the selected reference mark 51 is scanned by the scanning unit 53, the light of the lamp 60 passes through the condenser 61 in the scanning unit 53 to the mirror 56, and on to a photosensor 62 in the scanning unit 53. In this way, the presence or absence of the mirror 56 can be detected in order to cause the associated reference mark 51 to go into operation. The mirror 56 can readily be moved into alignment with another one of the reference marks 51 in the manner described above.

Figure 6:
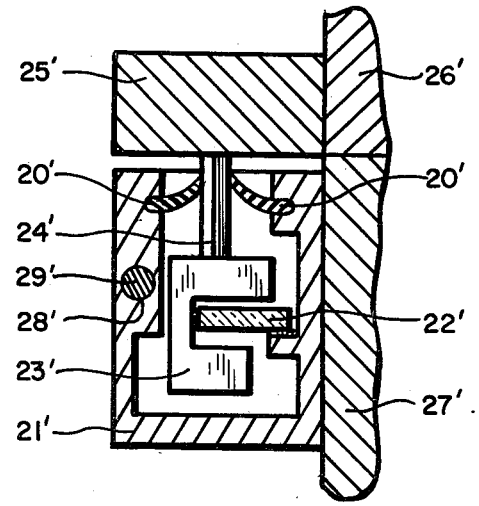
FIG. 6 is a cross-sectional view of a measuring instrument which includes a fifth preferred embodiment of this invention.

FIG. 6 shows yet another preferred embodiment of this invention which is incorporated in an incapsulated length measuring instrument. FIG. 6 corresponds in many ways to FIG. 3a, and the same components of these two drawings are provided with the same reference numerals, except that the reference numerals of FIG. 6 include a prime. The embodiment of FIG. 6 includes means for defining a bore 28' in the wall of the housing 21' facing away from the machine. A selector element in the form of a cylindrical magnet 29' is allocated to a selected one of a series of reference marks (not shown). The remaining length of the bore 28' is filled completely (in a manner not shown) with a number of filler elements, which are secured against longitudinal movement out of the bore 28' by holding elements (not shown) at the ends of the bore 28'. The magnet 29' can be moved into alignment with any one of the reference marks in the manner described above. Although the magnet 29' is not visible from the exterior of the measuring instrument, the magnet 29' can be clearly and unambiguously positioned in alignment with any selected one of the reference marks by counting the number of filler elements taken out of one end of the bore 28' and reintroduced at the other end of the bore 28'.

Since the selector elements 9, 29, 29', 48, 56 are not held in place by frictional means, no wear occurs. The filler elements 15, 30, 49, 57 are preferably made of a synthetic material, such as a plastic. The length of the filler elements can be equal to a whole number multiple of the distance between adjacent reference marks if only certain reference marks of the entire set of reference marks are to be selected. Furthermore, the filler elements can be provided with lengths equal to a whole number fraction of the distance between adjacent reference marks.

Instead of reed switch 10 as a switching means in the scanning unit, there can also be used a field plate. Furthermore, several selector elements 9, 29, 29', 48, 56 can be used in order to select a plurality of reference marks 4, 44, 54. In addition, selector elements which are sensed inductively or capacitively can also be used. The widest range of guides can be used in connection with this invention, in addition to the channels and bores described above.

Figure 7:
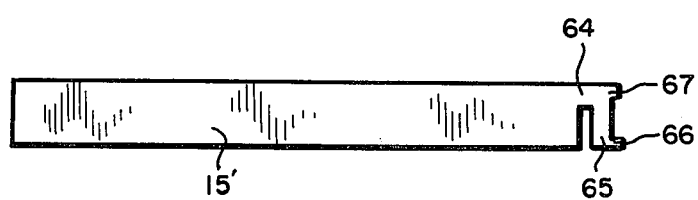
FIG. 7 is a plan view of a filler element suitable for use with this invention.

Because of manufacturing tolerances, the filler elements 15, 30, 49, 57 are each affected with a certain length tolerance. In order to accommodate such slight variations in length of the filler elements, it is advantageous in many embodiments to construct the filler elements 15, 30, 49, 57 to accommodate compression in a resilient or elastic manner in the longitudinal direction. FIG. 7 shows a filler element 15' which includes at one end a tongue 65 which is resiliently mounted to the remainder of the filler element 15' by means of a narrowed bridge 64. This bridge 64 acts to provide an axis of rotation perpendicular to the longitudinal direction. The tongue 65 also defines two projections 66, 67 of unequal lengths, with the longer of the two projections 66 situated farther from the bridge 64. In the unloaded state, the projection 66 determines the maximum length of the filler element 15'. In the loaded state, the spring path of the tongue 65 is limited by the projection 67 which determines the minimum length of the filler element 15'. The maximum length of the filler element 15' is chosen somewhat greater than the desired length of the filler element 15', so that length tolerances can be compensated for in a simple and automatic manner.

Furthermore, the invention is not restricted to photoelectric measuring instrument, but can also readily be adapted for use in magnetic, inductive, and capacitive measuring instruments. In addition, the present invention can also be used in an analogous manner in conjunction with absolute measuring devices that include incremental tracks.

Of course, it should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a measuring instrument of the type comprising a measuring scale which extends along a measuring direction and defines a measuring direction and plurality of reference marks, a scanning unit which includes means for detecting the reference marks and means for detecting at least one selector element positioned adjacent to the scale, and means for generating a reference pulse only when one of the reference marks and the selector element are simultaneously detected, such that only those reference marks which are associated with one of the selector elements are brought into action, the improvement comprising:

means for defining a guide which extends along the measuring direction adjacent the scale;

a column of elements coupled to the guide, said column of elements comprising the at least one selector element and a plurality of filler elements, positioned end to end, said guide, selector element, and filler elements shaped such that the column of elements is slideable along the guide yet is prevented from moving laterally out of contact with the guide;

and
holding elements positioned at two spaced locations of the guide, said holding elements movable between a first position, in which the column of elements is slideable along the guide, and a second position, in which the end elements in the column of elements are prevented from moving longitudinally past the holding elements;

said column of elements being of a length selected completely to fill the length of the guide between the holding elements in order to hold the at least one selector element in position, aligned with a selected one of the reference marks.

2. The invention of claim 1 wherein the reference marks are spaced in a periodic pattern with a predetermined distance between adjacent reference marks, wherein the length of each of the filler elements is equal to the predetermined distance, and wherein the length of the selector element is selected such that the length of the column of elements is equal to the length of the guide between the holding elements, the length of the selector element being no greater than the predetermined distance.

3. The invention of claim 1 wherein the length of at least some of the filler elements is equal to a whole number multiple of the separation between adjacent reference marks.

4. The invention of claim 1 wherein the length of at least some of the filler elements is equal to a whole number fraction of the separation between adjacent reference marks.

5. The invention of claim 1 wherein the selector element comprises a magnet.

6. The invention of claim 1 wherein the selector element comprises a light source.

7. The invention of claim 1 wherein the selector element comprises a mirror.

8. The invention of claim 1 wherein the selector element is inductively responsive.

9. The invention of claim 1 wherein the selector element is capacitively responsive.

10. The invention of claim 1 wherein the filler elements comprises a synthetic material.

11. The invention of claim 1 wherein the guide comprises a T-shaped groove.

12. The invention of claim 1 wherein the guide comprises a bore.

13. The invention of claim 1 wherein the means for detecting the selector element comprises a reed switch.

14. The invention of claim 1 wherein the means for detecting the selector element comprises a field plate.

15. The invention of claim 1 wherein the means for detecting the selector element comprises a photosensitive element.

16. The invention of claim 1 wherein at least some of the filler elements comprise resilient means for accommodating a selected amount of compression in the longitudinal direction.

17. The invention of claim 16 wherein the resilient means comprises a tongue resiliently mounted to one end of one of the filler elements to pivot about an axis perpendicular to the length of the filler element.

18. The invention of claim 17 wherein the tongue defines two protrusions of differing lengths at the end of the filler element, wherein the longer protrusion is farther from the axis than the shorter protrusion.

* * * * *